United States Patent
Unser et al.

(10) Patent No.: US 10,181,129 B2
(45) Date of Patent: Jan. 15, 2019

(54) METHOD AND SYSTEM FOR IDENTIFYING OPTIMAL REWARDS PROGRAMS

(71) Applicant: MASTERCARD INTERNATIONAL INCORPORATED, Purchase, NY (US)

(72) Inventors: Kenny Unser, Fairfield, CT (US); Serge Bernard, Danbury, CT (US); Nikhil Malgatti, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 876 days.

(21) Appl. No.: 14/103,132

(22) Filed: Dec. 11, 2013

(65) Prior Publication Data

US 2015/0161645 A1 Jun. 11, 2015

(51) Int. Cl.
*G06Q 30/00* (2012.01)
*G06Q 30/02* (2012.01)

(52) U.S. Cl.
CPC ..... *G06Q 30/0226* (2013.01); *G06Q 30/0255* (2013.01); *G06Q 30/0269* (2013.01)

(58) Field of Classification Search
CPC .. G06Q 20/102; G06Q 50/01; G06Q 20/3224; G06Q 30/0215; G06Q 30/0224; G06Q 30/0256; G06Q 30/0261; G06Q 30/0267; G06Q 30/0226; G06Q 30/0255; G06Q 30/0269; H04L 67/306; H04W 4/021; H04W 4/023; H04W 4/206; G01C 21/00; G06F 9/468
USPC ........................ 705/14.1, 14.27, 14.53, 14.66
See application file for complete search history.

(56) References Cited

U.S. PATENT DOCUMENTS

| | | | |
|---|---|---|---|
| 7,689,504 B2 | 3/2010 | Warren et al. | |
| 8,489,452 B1* | 7/2013 | Warner | G06Q 30/0226 |
| | | | 705/14.34 |
| 2006/0161478 A1* | 7/2006 | Turner | G06Q 30/02 |
| | | | 705/14.17 |

(Continued)

OTHER PUBLICATIONS

Lipka, Mitch, "A better way to monitor reward programs", https://www.reuters.com/article/us-column-yourrnoney-rewardprograms/ a-better-way-to-monitor-reward-programs-idUSBRE85Q14N20120627, Jun. 27, 2012. (Year: 2012).*

*Primary Examiner* — Michael Bekerman
(74) *Attorney, Agent, or Firm* — Ohlandt, Greeley, Ruggiero & Perle, L.L.P.

(57) ABSTRACT

A method and a system are provided for identifying optimal rewards programs. The method involves retrieving from one or more databases a first set of information comprising payment card holder transaction information including at least purchasing activities and optionally payment activities attributable to the payment card holder, and retrieving from one or more databases a second set of information comprising a plurality of rewards programs. One or more predictive behavioral spend profiles are generated based on the first set of information. The one or more predictive behavioral spend profiles and the second set of information are then analyzed to identify one or more correlations between the one or more predictive behavioral spend profiles and the plurality of rewards programs. Targeted information, based on the one or more correlations, is provided to one or more entities (e.g., payment card holder or merchant).

17 Claims, 9 Drawing Sheets

(56) References Cited

U.S. PATENT DOCUMENTS

| | | | |
|---|---|---|---|
| 2007/0156530 A1* | 7/2007 | Schmitt | G06Q 30/02 705/14.35 |
| 2010/0179857 A1* | 7/2010 | Kalaboukis | G06Q 20/203 705/14.4 |
| 2011/0087546 A1* | 4/2011 | Fordyce, III | G06Q 20/10 705/14.53 |
| 2011/0087550 A1 | 4/2011 | Fordyce, III et al. | |
| 2011/0218884 A1* | 9/2011 | Kothari | G06Q 30/02 705/27.1 |
| 2011/0264501 A1* | 10/2011 | Clyne | G06Q 20/10 705/14.25 |
| 2012/0066045 A1 | 3/2012 | Schmitt et al. | |
| 2012/0072277 A1 | 3/2012 | Moore et al. | |
| 2013/0080236 A1 | 3/2013 | Royyuru et al. | |
| 2013/0151323 A1 | 6/2013 | Shepard et al. | |
| 2013/0191213 A1* | 7/2013 | Beck | G06Q 30/0267 705/14.53 |
| 2013/0246120 A1* | 9/2013 | Chang | G06Q 30/0204 705/7.29 |
| 2013/0282465 A1 | 10/2013 | Fitzhugh et al. | |
| 2015/0081432 A1* | 3/2015 | Berntsson | G06Q 30/0255 705/14.53 |
| 2015/0100404 A1* | 4/2015 | Globe | G06Q 30/0631 705/14.27 |
| 2017/0024538 A1* | 1/2017 | Siddiqui | G06Q 50/22 |

\* cited by examiner

METHOD AND SYSTEM FOR IDENTIFYING OPTIMAL REWARDS PROGRAMS

BACKGROUND OF THE DISCLOSURE

1. Field of the Disclosure

The present disclosure relates to a method and a system for identifying optimal rewards programs. In particular, a method and a system are provided that can be used by payment card holders to select the best rewards programs based on their spend profile, or used by merchants or businesses to better target customers or enhance existing customer relationships.

2. Description of the Related Art

Rewards programs are becoming increasingly popular. Rewards are offered that aim to encourage or induce customer affiliation by rewarding all or select transactions. Rewards are typically based on any number of transaction particulars, such as spending levels, types of transaction, identity of merchant or vendor, location of transactions, or any other data or information that demonstrates user behavior. For example, a rewards program sponsor may provide incentives (e.g., rebates or discounts) on purchases made through a particular vendor or merchant. Rewards may also include cash-back deals where the customer earns a percentage of the transaction amounts as cash value that gets added to the customer's account.

In some cases, reward programs may be associated with a particular sponsor or merchant so that the customer can earn points that may be redeemed through the sponsor or merchant. For example, a rewards program sponsored by an airline may reward the customer with airline miles that may be redeemed for free or discounted travel. Likewise, some rewards programs may reward the customer with virtual cash to make purchases through select merchants and vendors.

Although conventional systems and methods enable rewards program sponsors to provide customers with a wide variety of reward earning opportunities, they nonetheless suffer from several notable drawbacks. For example, current systems and methods do not enable rewards program sponsors to identify and offer customers with relevant reward earnings on an ongoing basis. Existing systems and methods depend primarily on mass mailings and other like marketing techniques to generate interest in rewards program. Once a customer subscribes to a particular reward program, there is no known system or technique for ensuring that reward earnings/program remain relevant to the customer in the future, or for revising reward earnings/program should needs or circumstances change. As a result, many potential reward earning marketing opportunities go unrealized resulting in diminished value for reward programs in general.

Thus, what is needed is a system and/or a method that enables a rewards program sponsor to identify, recommend and, perhaps, offer to customers relevant reward earnings/programs based on customer particulars, such as demonstrated customer transaction history.

SUMMARY OF THE DISCLOSURE

The present disclosure provides a method and a system for identifying optimal rewards programs for payment card holders based on payment transaction data of the payment card holders.

The present disclosure further provides a method that involves retrieving from one or more databases a first set of information comprising payment card holder transaction information including at least purchasing activities attributable to the payment card holder, and retrieving from the one or more databases a second set of information comprising a plurality of rewards programs. One or more predictive behavioral spend profiles are generated based on the first set of information. The one or more predictive behavioral spend profiles and the second set of information are then analyzed to identify one or more correlations between the one or more predictive behavioral spend profiles and the plurality of rewards programs. Targeted information, based on the one or more correlations, is provided to one or more entities (e.g., payment card holders or merchants).

The present disclosure also provides a system that includes one or more databases configured to store a first set of information comprising payment card holder transaction information including at least purchasing activities attributable to the payment card holder, and one or more databases configured to store a second set of information comprising a plurality of rewards programs. The system includes a processor configured to: generate one or more predictive behavioral spend profiles based on the first set of information; analyze the one or more predictive behavioral spend profiles and the second set of information to identify one or more correlations between the one or more predictive behavioral spend profiles and the plurality of rewards programs; and provide targeted information, based on the one or more correlations, to one or more entities.

The present disclosure further provides a method for generating one or more predictive behavioral spend profiles. The method involves retrieving, from one or more databases, payment card holder transaction information including at least purchasing activities attributable to one or more payment card holders; analyzing the information to determine behavioral information of the one or more payment card holders; extracting information related to an intent of the one or more payment card holders from the behavioral information; and generating one or more predictive behavioral spend profiles based on the behavioral information and intent of the one or more payment card holders. The one or more payment card holders have a propensity to carry out certain activities based on the one or more predictive behavioral models.

In accordance with the present disclosure, a method and a system are provided that can be used by payment card holders to select the best rewards programs based on their spend profile. In addition, the system and method of this disclosure can be used by merchants or businesses to better target customers or to enhance existing customer relationships.

BRIEF DESCRIPTION OF THE DRAWINGS

A component or a feature that is common to more than one drawing is indicated with the same reference number in each drawing.

DESCRIPTION OF THE EMBODIMENTS

Figure 1:
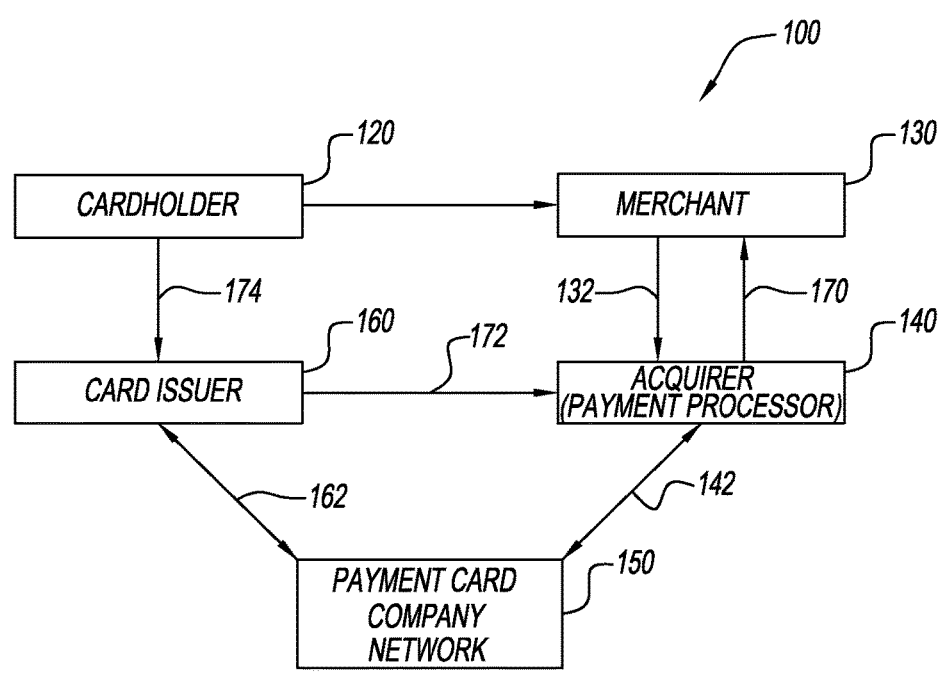
FIG. 1 is a diagram of a four party payment card system.

Embodiments of the present disclosure are described more fully hereinafter with reference to the accompanying drawings, in which some, but not all, embodiments of the disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

As used herein, entities can include one or more persons, organizations, businesses, institutions and/or other entities, such as financial institutions, services providers, and the like that implement one or more portions of one or more of the embodiments described and/or contemplated herein. In particular, entities can include a person, business, school, club, fraternity or sorority, an organization having members in a particular trade or profession, sales representative for particular products, charity, not-for-profit organization, labor union, local government, government agency, or political party. It should be understood that the methods and systems of this disclosure can be practiced by a single entity or by multiple entities. Although different entities can carry out different steps or portions of the methods and systems of this disclosure, all of the steps and portions included in the methods and systems of this disclosure can be carried out by a single entity.

As used herein, the one or more databases configured to store the first set of information or from which the first set of information is retrieved, and the one or more databases configured to store the second set of information or from which the second set of information is retrieved, can be the same or different databases.

As used herein, rewards programs include all types of programs that are structured marketing efforts that reward, and therefore encourage, loyal buying behavior or behavior that is beneficial to a merchant. Rewards programs include all types of rewards programs, loyalty programs, affinity programs, and the like. By being affiliated with a rewards program, a member is typically entitled to either a discount on the current purchase, or an allotment of points that can be used for future purchases. Rewards programs are offered, for example, by major retailers, pharmacies, supermarkets, hardware stores, hotel chains, airlines, car rentals, banks, and the like.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the present disclosure.

Thus, systems, methods and computer programs are herein disclosed to generate one or more predictive behavioral spend profiles based on a first set of information (e.g., payment card holder transaction information including at least purchasing activities and optionally payment activities attributable to the payment card holder); analyze the one or more predictive behavioral spend profiles and a second set of information (e.g., a plurality of rewards programs) to identify one or more correlations between the one or more predictive behavioral spend profiles and the plurality of rewards programs; and provide targeted information, based on the one or more correlations, to one or more entities.

Among many potential uses, the systems and methods described herein can be used to: (1) induce customer loyalty by identifying, prioritizing, suggesting and recommending to payment card holders relevant rewards programs based on payment card holder behavior (e.g., past payment card transactions), and other factors, such as, for example, favorite or repeat merchants, location of transactions, spending levels, biographical or demographic information, or any other data or information that can be used to particularize or focus recommendations of reward programs; (2) allow payment card holders to switch between rewards programs, either through the same or different rewards card; (3) allow issuers and sponsors, for example, to update and revise their affiliated rewards programs; (4) allow conversion of rewards between different rewards programs; (5) allow centralized coordination and recommending of multiple rewards programs; (6) track customer transactions and decision-making to enhance the resolution and precision of reward program recommendations; and (7) allow a third party (e.g., a bank or other financial institution) to administer and coordinate the providing of relevant reward program recommendations; (8) allow a user to specify future activity, behavior or transactions that the various systems and methods can then use to recommend or suggest relevant reward programs; (9) allow payment card holders to select best rewards programs; and (10) allow merchants to better target customers and/or enhance existing customer relationships. Other uses are possible.

Referring to the drawings and, in particular, FIG. 1, there is shown a four party payment (credit, debit or other) card system generally represented by reference numeral 100. In card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes a financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, if the transaction is approved, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

In accordance with the method of this disclosure, information that is stored in one or more databases can be retrieved (e.g., by a processor). The information can contain, for example, a first set of information including payment card holder transaction information including at least purchasing activities and optionally payment activities attributable to the payment card holder. Illustrative first set information can include, for example, financial (e.g., billing statements), demographic (e.g., age and gender), geographic (e.g., zip code and state or country of residence), and the like. Also, the information can contain, for example, a second set of information including a plurality of rewards programs. Illustrative second set information can include, for example, rewards programs including loyalty programs, affinity programs, and the like. The second set of information can include details of the rewards, for example, whether a member is entitled to a discount on the current purchase, or whether an allotment of points can be used for future purchases. The second set of information can be categorized, for example, by major retailers, pharmacies, supermarkets, hardware stores, hotel chains, airlines, banks, and the like.

In an embodiment, all information stored in each of the one or more databases can be retrieved. In another embodiment, only a single entry in each database can be retrieved. The retrieval of information can be performed a single time, or can be performed multiple times. In an exemplary embodiment, only information pertaining to a specific predictive behavioral spend profile is retrieved from each of the databases.

Figure 2:
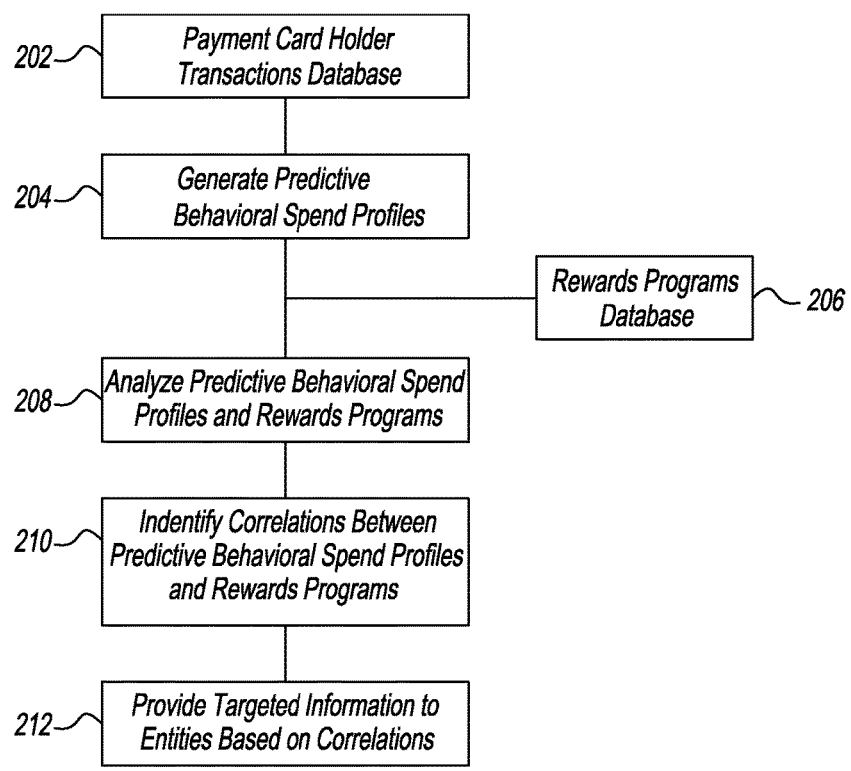
FIG. 2 is a flow chart illustrating a method for providing targeted information, based on correlations, to entities in accordance with exemplary embodiments of this disclosure.

Referring to FIG. 2, the method and system of this disclosure involve retrieving from one or more payment card holder transaction databases at 202 a first set of information comprising payment card holder transaction information including at least purchasing activities and optionally payment activities attributable to the payment card holder, and retrieving from one or more rewards programs databases at 206 a second set of information comprising a plurality of rewards programs. As more fully described herein, one or more predictive behavioral spend profiles are generated at 204 based on the first set of information 202. The one or more predictive behavioral spend profiles 204 and the second set of information 206 are analyzed at 208 to identify one or more correlations 210 between the one or more predictive behavioral spend profiles and the plurality of rewards programs. At 212, targeted information is provided to one or more entities (e.g., a payment card holder or merchant) based on the one or more correlations. The targeted information includes at least one or more suggestions or proposals for payment card holder affiliation with one or more rewards programs.

In an embodiment, the first set of information algorithmically analyzed to generate the one or more predictive behavioral spend profiles. In another embodiment, the one or more predictive behavioral spend profiles and the second set of information are algorithmically analyzed to identify one or more correlations between the one or more predictive behavioral spend profiles and the plurality of rewards programs.

As indicated, the one or more correlations are generated between the one or more predictive behavioral spend profiles and the plurality of rewards programs. For example, a payment card holder has a rewards program that awards miles with an air carrier. However, the payment card holder rarely purchases air travel and instead seems to drive a lot. In this instance, the payment card holder could better optimize his or her rewards by switching to a reward program that offers cash back (e.g., 3%) on gasoline.

In another example, a payment card holder spends a lot of money on shipping. The payment card holder perhaps has an e-commerce business. The payment card holder may be able to save money by opening a FedEx® account and rewards programs more closely aligned to the payment card holder's business.

In yet another example, a payment card holder spends a lot of money (e.g., $1000) annually at sporting goods stores. By affiliating with a rewards program offered by a sporting goods store, the payment card holder could get cash-back awards annually (e.g., $100).

The above examples illustrate how the system and method of this disclosure can be used by payment card holders to select the best rewards programs based on their spend profile. In addition, the system and method of this disclosure can be used by merchants or businesses to better target customers or to enhance existing customer relationships.

In accordance with the method of this disclosure, one or more predictive behavioral spend profiles are generated based at least in part on the first set of information comprising payment card holder transaction information including at least purchasing activities and optionally payment activities attributable to the payment card holder. Predictive behavioral spend profiles can be selected based on the information obtained and stored in the one or more payment card holder transaction databases. The selection of information for representation in the predictive behavioral spend profiles can be different in every instance. In one embodiment, all information stored in each database can be used for selecting predictive behavioral spend profiles. In an alternative embodiment, only a portion of the information is used. The generation and selection of predictive behavioral spend profiles may be based on specific criteria.

Predictive behavioral spend profiles are generated from the information obtained from the one or more payment card holder transaction databases. The information is analyzed, extracted and correlated by, for example, a financial transaction processing company (e.g., a payment card company), and can include financial account information, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

Activities and characteristics attributable to the payment card holders based on the one or more predictive behavioral spend profiles are identified. The payment card holders have a propensity to carry out certain activities and to exhibit certain characteristics based on the one or more predictive behavioral spend profiles. The activities and characteristics attributable to the payment card holders and based on the one or more predictive behavioral spend profiles are analyzed with the second set of information comprising the plurality of rewards programs to identify one or more correlations between the one or more predictive behavioral spend profiles and the plurality of rewards programs. Targeted information, based on the one or more correlations, is conveyed to one or more entities (e.g., a payment card holder or a merchant). This enables one or more targeted suggestions or proposals relating to payment card holder affiliation with one or more rewards programs to be made to one or more entities. The transmittal can be performed by any suitable method as will be apparent to persons having skill in the relevant art.

Predictive behavioral spend profiles can optionally be defined based on geographical or demographical information, including, but not limited to, age, gender, income, marital status, postal code, income, spending propensity, and familial status. In some embodiments, predictive behavioral spend profiles can be defined by a plurality of geographical and/or demographical categories. For example, a predictive behavioral spend profile can be defined for any card holder with an income between $50,000 and $74,999, which card holder is between the ages of 20 and 29, and is single.

Predictive behavioral spend profiles can also be based on behavioral variables. For example, the financial transaction processing entity database can store information relating to financial transactions. The information can be used to determine an individual's likeliness to spend. An individual's likeliness to spend can be represented generally, or with respect to a particular industry (e.g., electronics), retailer (e.g., Macy's®), brand (e.g., Apple®), or any other criteria that can be suitable as will be apparent to persons having skill in the relevant art. An individual's behavior can also be based on additional factors, including but not limited to, time, location, and season. For example, a predictive behavioral spend profile can be based on consumers who are likely to spend on electronics during the holiday season, or on consumers whose primary expenses are in a suburb, but are likely to spend on restaurants located in a major city. The factors and behaviors identified can vary widely and can be based on the application of the information.

Behavioral variables can also be applied to generated predictive behavioral spend profiles based on the attributes of the entities. For example, a predictive behavioral spend profile of specific geographical and demographical attributes (e.g., single males in a particular postal code between the ages of 26-30 with an income between $100,000 and $149,999) can be analyzed for spending behaviors. Results of the analysis can be assigned to the predictive behavioral spend profiles. For example, the above predictive behavioral spend profile is analyzed and reveals that the entities in the predictive behavioral spend profile have a high spending propensity for electronics and are less likely to spend money during the month of February.

In an embodiment, the information retrieved from the one or more databases can be analyzed to determine behavioral information of the payment card holders. Also, information related to an intent of the payment card holders can be extracted from the behavioral information. The predictive behavioral spend profiles can be based upon the behavioral information of the payment card holders and the intent of the payment card holders. The predictive behavioral spend profiles can be capable of predicting behavior and intent in the payment card holders.

Predictive behavioral spend profiles can be developed, for example, to examine spend behaviors and create spend associations. A spend association can be a set of spend behaviors that predict another spend behavior. For example, people who tend to purchase jewelry display the following spend behaviors: purchase at Macy's®, travel on cruise ships, go to the movie theaters once a month, and so forth.

Figure 3:
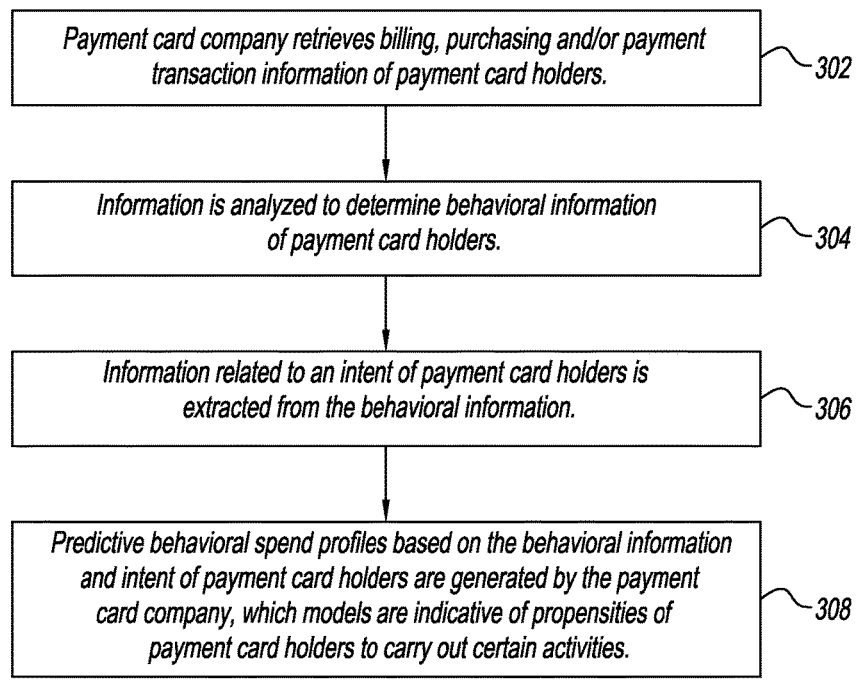
FIG. 3 is a flow chart illustrating a method for generating predictive behavioral spend profiles in accordance with exemplary embodiments of this disclosure.

A method for generating one or more predictive behavioral spend profiles is an embodiment of this disclosure. Referring to FIG. 3, the method involves a payment card company (part of the payment card company network 150 in FIG. 1) retrieving, from one or more databases, payment card holder transaction information 302 including at least purchasing activities and optionally, payment activities attributable to the payment card holder. The information 302 comprises payment card billing, purchasing, and/or payment transactions, and optionally demographic and/or geographic information. The information is analyzed 304 to determine behavioral information of the one or more payment card holders. Information related to an intent 306 of the one or more payment card holders is extracted from the behavioral information. One or more predictive behavioral spend profiles are generated 308 based on the behavioral information and intent of the one or more payment card holders. The one or more payment card holders have a propensity to carry out certain activities based on the one or more predictive behavioral spend profiles.

In analyzing information to determine behavioral information, intent (payment card holder) and other payment card holder attributes are considered. Developing intent of payment card holders involves profiles that predict specific spend behavior in the future and desirable spend behaviors. Examples include as follows: likely to purchase at Macy's® in the next 2 weeks; likely to spend at least $100 in consumer electronics in the next 30 days; likely to purchase a car in the next 60 days; likely to be interested in golfing; likely to be up for a cell phone renewal in the next 60 days; likely to be a business traveler; and the like.

Predictive behavioral spend profiles can equate to purchase behaviors. There can be different degrees of predictive behavioral spend profiles with the ultimate behavior being a purchase. An example using Macy's® is as follows: an extreme behavior is a consumer purchasing something once a week at Macy's® and spending five times what the average customer spends; a medium behavior is a consumer purchasing something at Macy's® once a month and spending twice what the average customer spends; and a low behavior is a consumer purchasing something at Macy's® once a year and spending what the average customer spends.

There is the potential for numerous predictive behavioral spend profiles including, for example, industries (e.g., consumer electronics, QSR), categories (e.g., online spend, cross border), geography spend (e.g., spend in New York City, spend in London), geography residence (e.g., live in New York City, live in Seattle), day/time spend (e.g., weekday spend, lunch time spend), calendar spend (e.g., spend a lot around Christmas, spend a lot on flowers before Valentine's Day), top number of merchants, and the like.

Other card holder attributes part of the information include, for example, geography (e.g., zip code, state or country), and demographics (e.g., age, gender, and the like).

The activities and characteristics attributable to the payment card holders and based on the one or more predictive behavioral spend profiles are analyzed with the second set of information comprising the plurality of rewards programs to identify one or more correlations between the one or more predictive behavioral spend profiles and the plurality of rewards programs. Targeted information, based on the one or more correlations, is conveyed to one or more entities (e.g., a payment card holder or a merchant). This enables one or more targeted suggestions or proposals relating to payment card holder affiliation with one or more rewards programs to be made to one or more entities. The one or more predictive behavioral spend profiles are capable of predicting behavior and intent in the one or more payment card holders. The one or more payment card holders are people and/or businesses, the activities attributable to the one or more payment card holders are financial transactions associated with the one or more payment card holders, and the characteristics attributable to the one or more payment card holders are demographics and/or geographical characteristics of the one or more payment card holders.

A behavioral propensity score can be used for conveying to the one or more entities the activities and characteristics attributable to the one or more payment card holders based on the one or more predictive behavioral spend profiles. The behavioral propensity score is indicative of a propensity to exhibit a certain behavior.

Figure 4:
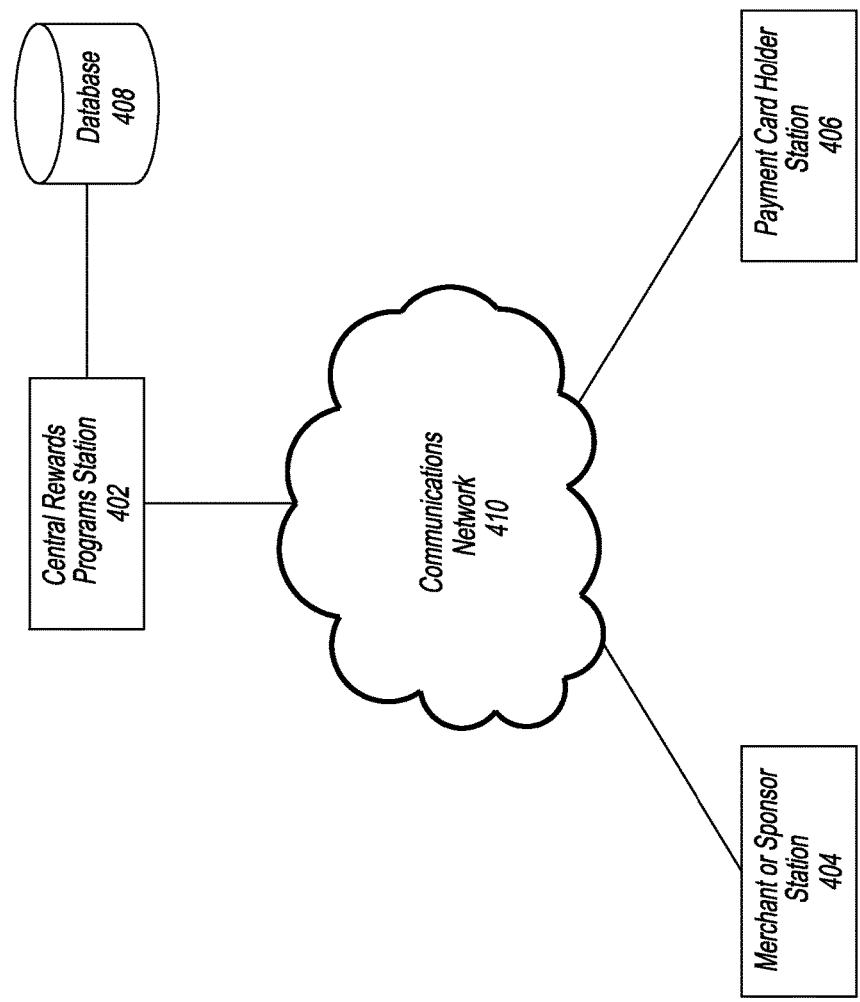
FIG. 4 shows an exemplary system for providing targeted information, based on correlations, to payment card holders and merchants in accordance with exemplary embodiments of this disclosure.

FIG. 4 illustrates a system 400 for suggesting or recommending rewards programs according to one embodiment of the disclosure. System 400 can comprise a central reward program station 402 for identifying, suggesting and recommending rewards programs based on payment card holder particulars, such as past payment transactions and expressed interests and needs. In some embodiments, central rewards programs station 402 can be administered by a financial transaction processing entity, e.g., a payment card company such as MasterCard®, Visa®, American Express®, and the like (part of the payment card company network 150 in FIG. 1), a bank or financial institution that issues and administers cards (e.g., a card issuer 160 in FIG. 1), a merchant or vendor that sponsors a reward program (e.g., a sponsor), or any third party that coordinates, manages or administers payment card holder interaction with merchants at merchant or sponsor station 404 via cards and corresponding rewards programs.

In some embodiments, central rewards programs station 402 can maintain particulars about payment card holders, reward programs, merchants, and any data and information that may be used to identify, suggest and recommend rewards programs according to the systems and methods described herein. In some embodiments, central rewards program station 402 can comprise the central headquarters or repository of the various features and functions of the systems and methods described herein, and can be maintained by any party or entity that administers the coordination of data and information in connection with the identification, suggesting and recommending of rewards programs according to the systems and methods described herein.

Central rewards programs station 402 can comprise a single server or engine. In another embodiment, central rewards programs station 402 can comprise a plurality of servers or engines, dedicated or otherwise, which can further host modules for performing desired system functionality. Central rewards programs station 402, for example, can host one or more applications or modules that function to permit interaction between the users of system 400 (e.g., merchants, payment card holders, the administrator of central rewards programs station 402, and any other relevant parties) as it relates to exchanging and processing of data and information related to the identification, suggesting and recommending of reward programs, for example.

For instance, central rewards programs station 402 can include an administration module that serves to permit interaction between the system 400 and the individual(s) or entity(ies) charged with administering system 400 or central rewards programs station 402. Such an administration module can enable the agent of central rewards programs station 402, for example, to input information related to reward programs, including but not limited to, parameters used to determine which reward programs to suggest or recommend to a payment card holder, and how such reward programs are to be prioritized or ordered for purposes of reward accumulation. Such parameters can comprise variables that define a particular pool or segment of payment card holders that can be presented with a particular rewards program. Thus, for example, a reward program offering 10% discounts on groceries should be recommended to payment card holders that through past transactions, for example, demonstrate a high frequency of grocery shopping via the payment card. This way, rewards programs can be properly targeted and focused on payment card holders most inclined to appreciate and benefit therefrom.

According to various embodiments, an agent of central rewards programs station 402 can interface with a graphical user interface (or GUI) to input: (1) data or information (e.g., terms, words, phrases, or digits) that enable the agent to define particular pools of payment card holders based on payment transaction data, (2) data or information that enable the agent to define particular rewards programs, (3) data or information that enable the agent to define particulars about merchants or sponsors through which the reward programs will be delivered, (4) rules, parameters and algorithms used to identify which reward programs to suggest or recommend to payment card holders, and (5) particulars about converting rewards between various reward programs, including, for example, maintaining and updating conversion rates. An agent of central rewards program station 402 can also input information or data regarding how reward programs are stored (e.g., categorized) in a database 408, for example. Other modules permit processing of the various features and functionality described herein for identifying, suggesting and recommending reward programs (see FIG. 5 for modules associated with central rewards program station 402).

Central rewards programs station 402 can include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Data and information maintained by central rewards program station 402 can be stored and cataloged in database 408 that can comprise or interface with a searchable database. Database 408 can comprise, include or interface to a relational database. Other databases, such as a query format database, a Standard Query Language (SQL) format database, a storage area network (SAN), or another similar data storage device, query format, platform or resource, can be used. Database 408 can comprise a single database or a collection of databases, dedicated or otherwise. In one embodiment, database 408 can store or cooperate with other databases to store the various data and information described herein. In some embodiments, database 408 can comprise a file management system, program or application for storing and maintaining data and information used or generated by the various features and functions of the systems and methods described herein. In some embodiments, database 408 can store, maintain and permit access to payment card holder information, sponsor or rewards program information, and general information used to identify, suggest and/or recommend reward programs, as described herein.

In particular, database 408 can store, maintain and permit access to the first set of information comprising payment card holder transaction information including at least purchasing activities and optionally payment activities attributable to the payment card holder, and also the second set of information comprising a plurality of rewards programs. The one or more predictive behavioral spend profiles generated based on the first set of information can also be stored, maintained and accessed in database 408. The one or more correlations between the one or more predictive behavioral spend profiles and the plurality of rewards programs can further be stored, maintained and accessed in database 408. Also, the targeted information, based on the one or more correlations, that is provided to the one or more entities (e.g., a payment card holder or merchant) can be stored, maintained and accessed in database 408. The targeted information includes at least one or more suggestions or proposals for payment card holder affiliation with one or more rewards programs.

Central rewards station 402 can, in some embodiments, be accessed via a communication network 410. Communications network 410 can comprise, or can interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network 410 can also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 410 can further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 410 comprises a satellite communications network, such as a direct broadcast communication system (DBS) having the requisite number of dishes, satellites and transmitter/receiver boxes, for example. Communications network 410 can also comprise a telephone communications network, such as the Public Switched Telephone Network (PSTN). In another embodiment, communication network 410 comprises a Personal Branch Exchange (PBX), which further connects to the PSTN.

As shown in FIG. 4, merchant or sponsor station 404 and payment card holder station 406 can communicate with central rewards programs station 402 via communication network 410. Merchant or sponsor station 404 can comprise, for example, a station utilized by an agent of a merchant or a sponsor to interact or communicate with payment card holders. For example, station 404 can comprise a call center facility or station of a merchant or sponsor that is manned by an operator to receive calls from payment card holders. In some embodiments, merchant or sponsor station 404 can comprise or host web sites or web pages of the merchant or sponsor that a payment card holder can access to interact with or engage the various features or functionality associated with the rewards program.

Payment card holder station 406, in some embodiments, enables a payment card holder to interact with and communicate with a merchant or sponsor as represented by merchant or sponsor station 404. For example, payment card holder station 406 can enable a payment card holder to call or access the web site or page of a merchant or sponsor to inquire about account particulars of available rewards programs. In some embodiments, payment card holder station 406 comprises any terminal (e.g., a typical home or personal computer system) in which a payment card holder interacts with a network, such as communications network 410, for example, that is responsible for transmitting and delivering data and information used by the various systems and methods described herein. Payment card holder station 406 can comprise or include, for instance, a personal or laptop computer.

Payment card holder station 406 can include a microprocessor, a microcontroller or other general or special purpose device operating under programmed control. Payment card holder station 406 can further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Payment card holder station 406 can be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Payment card holder station 406 can also include a network-enabled appliance, a browser-equipped or other network-enabled cellular telephone, or another TCP/IP client or other device.

Figure 5:
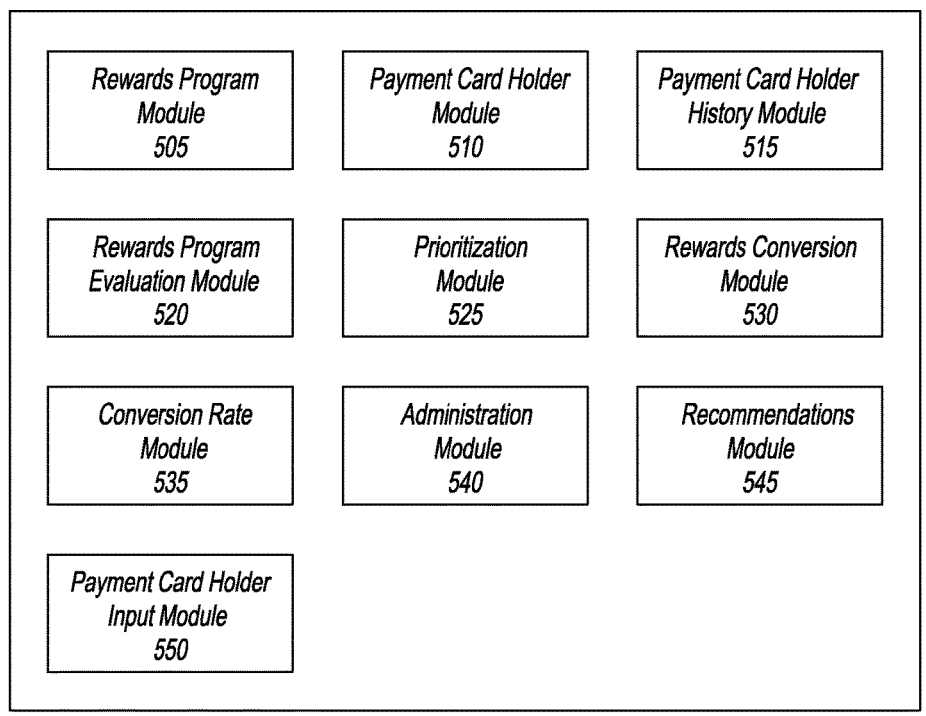
FIG. 5 illustrates various exemplary system modules that may be used in accordance with exemplary embodiments of this disclosure.

FIG. 5 illustrates exemplary modules that can be associated with central rewards programs station 402 for carrying out (or administering) the various functions and features of the embodiments described herein. In some embodiments, the modules can: (1) be accessed by an agent or administrator of central rewards program station 402, (2) store, maintain and administer particulars on a plurality of rewards programs that are available to payment card holders, (3) store, maintain and administer particulars on a plurality of payment card holders, (4) track payment card holder transactions and store, maintain and administer payment card holder transaction histories for use in identifying reward programs, (5) evaluate a payment card holder's existing reward programs against alternative reward programs based on particulars about the payment card holder, payment card holder's transactions, or any other data or information that may demonstrate the payment card holder's needs, (6) suggest or recommend to a payment card holder a particular reward program(s) that better relate to the payment card holder's transaction or reward program history or demonstrated interest; (7) prioritize or order a payment card holder's reward programs based on the payment card holder's transaction or reward program history or demonstrated interest; (8) convert reward value between reward programs, and (9) store, maintain and administer reward conversion rates. Other features and functionality are of course possible. While the modules cannot be used in all embodiments to perform some or all of the functions of the present disclosure, they are nonetheless presented as possible embodiments.

Rewards program module 505, in some embodiments, processes and maintains data and information relating to reward programs that are available to payment card holders. For example, reward programs can be stored and maintained by category, such as cash-back programs, proprietary programs (e.g., programs administered by the issuer of the card), loyalty programs (e.g., cards that are branded and reward loyalty to the sponsor), or any other type or category of rewards that are used to identify and recommend reward programs according to the systems and methods described herein. Reward programs can also be stored by good or device or by category of good or service. For example, a reward program can be associated with a particular product (e.g., as identified by SKU number), by retailer or merchant name, or by a general category, such as "grocery stores," for example. Other techniques for categorizing are of course possible.

Payment card holder module 510, in some embodiments, processes and maintains data and information relating to payment card holders, such as, for example, the identity of the payment card holder, the location (e.g., residential or work address) of the payment card holder, the payment card holder's preferred or favorite merchants, products or services, the card(s) associated with the payment card holder, the reward programs associated with the payment card holder, or any other biographical or demographic information that can be used to identify, prioritize, suggest or recommend relevant reward programs to the payment card holder according to the systems and methods described herein. In some embodiments, payment card holder module 510 cooperates with rewards program module 505 to associate particular payment card holders with particular reward programs to enable the various systems and methods described herein to identify, suggest and recommend reward programs that are relevant and of interest to payment card holders.

Payment card holder history module 515, in some embodiments, processes and maintains data and information relating to payment card holder transactions. For example, payment card holder history module 515, for a particular payment card holder, processes and maintains any and all transactions (e.g., purchases) that the payment card holder has processed using a particular card, including the date of the transaction, the identity of the merchant or vendor, the amount of the transaction, the location of the transaction, the goods or services purchased (e.g., identified by SKU number), the reward value earned (e.g., redeemable points, cash, sponsor or issuer redeemable value), or any other data or information that can be used to classify the transaction in such a way that it can be used to identify and recommend reward programs according to the systems and methods described herein.

Rewards program evaluation module 520, in some embodiments, evaluates a payment card holder's particulars (e.g., data or information from payment card holder history module 215) and identifies, suggests and recommends rewards programs that can be of particular interest or relevance to the payment card holder. In some embodiments, payment card holder particulars can comprise payment card holder information, transaction history, merchant or vendor information, and any information or data that can be used to identify relevant reward programs as described herein. In some embodiments, upon the occurrence of an event that triggers the identification, prioritization, suggestion or recommendation of reward programs (e.g., the periodic processing of transaction or reward program information, such as for purposes of preparing and generating a monthly statement of transactions), rewards program evaluation module 520 can identify reward programs that can be of general or particular relevance or interest to the payment card holder. In some embodiments, some or all of the reward programs available for recommendation can be administered by the administrator of central rewards programs station 402, while in some embodiments some or all of the reward programs can be administered by a third party.

Prioritization module 525, in some embodiments, prioritizes order reward programs or components. In some embodiments, prioritization module 525 cooperates with rewards program evaluation module 520 to prioritize or recommend reward programs in such a way that the associated payment card holder, for example, can receive rewards programs recommendations in a relevant and focused manner. For example, assume a payment card holder's transaction history or reward program history reflects that the payment card holder has made two (2) transactions with a restaurant, five (5) transactions with a gas station and three (3) transactions with a grocery store. In some embodiments, rewards program evaluation module 520 can evaluate this information and identify and recommend three reward programs that the payment card holder should earn rewards in: (1) a dining discount program, (2) a gas discount program, and (3) a grocery discount program.

In some embodiments, prioritization module 525 can then prioritize or order the reward programs in such a way that the payment card holder realizes greater savings. For example, prioritization module 525 associates the reward programs with discount rates, for example, according to the frequency of transactions. Thus, in the example provided, prioritization module 525 can order the rewards in such a way that the payment card holder would get 10% discounts at gas stations, 7% discounts at grocery stores, and 5% discounts in dining. In some embodiments, the top categories of rewards can earn equivalent rewards, such as, for example, 10% discounts at gas stations, 10% discounts at grocery stores, and 10% discounts in dining. In some embodiments, prioritization module 525 prioritizes or orders reward programs according to rules or algorithms that specify how such prioritizing or ordering should occur. For example, the rules can specify what type of rewards are to be administered (e.g., coupons, discounts, rebates, and the like), or how they are to be administered. In some embodiments, the rules can be determined by an administrator of central reward programs station 402, or by the payment card holder himself.

In other example, prioritization module 525 can associate reward programs based on the total amount spent by the payment card holder, for example, on particular goods or services, or categories of goods or services. For example, assume the payment card holder spends $135 at two restaurant outings, $233 on groceries on three occasions, and $150 at four gas stations over a one month period. In this example, as above, rewards program evaluation module 520 can evaluate this information and conclude that the payment card holder should be enrolled in: (1) a dining discount program, (2) a gas discount program, and (3) a grocery discount program. In some embodiments, prioritization module 525 then prioritizes or orders the reward programs in such a way that the payment card holder realizes greater savings. However, in this example, prioritization module 525 can associate the reward programs with discount rates, for example, according to the total spent per category of goods or services. Thus, prioritization module 525 can prioritize or order the reward programs in such a way that the payment card holder would get 10% discounts at grocery stores, 7% discounts at gas stations, and 5% discounts at restaurants. Prioritization module 525 can, of course, utilize any scheme, rules or algorithms to determine how reward programs are to be prioritized or ordered.

Rewards conversion module 530, in some embodiments, converts between rewards associated with various rewards programs, or credit value to reward programs. For example, if the systems and methods described herein enroll a payment card holder in a new rewards program, rewards conversion module 530 can convert any rewards that have been accumulated by the payment card holder, for example, in a previous rewards program to the equivalent reward(s) in the new rewards program that the payment card holder has been switched to. In some embodiments, the conversion can be one-to-one, such that 100 reward value units (e.g., points), for example, in the initial rewards program translates into 100 reward value units (e.g., points) in the new rewards program. In some embodiments, a particular conversion rate is referenced to calculate the appropriate translation of rewards. For example, reward program A can have a one-to-two ratio conversion with program reward B. Accordingly, if the payment card holder had accumulated 100 value units (e.g., points) in program A, he or she would obtain 200 value units (e.g., points) for switching to program B. In some embodiments, rewards conversion module 530 credits value to a reward program according the various systems and methods described herein. Other scenarios are possible.

Conversion rate module 535, in some embodiments, facilitates the rewards conversion process for payment card holder transactions by storing and maintaining conversion rates between various reward programs. This way, rewards conversion module 530 can readily obtain conversion rate information when needed. In some embodiments, conversion rates administered my conversion rate module 535 can be administered and revised by an agent of central rewards program station 402, for example.

Administration module 540, in some embodiments, enables an administrator of central rewards program station 402, for example, to interact with the various modules, features and functionality described herein. For example, an agent of central rewards program station 402 can interact with administration module 540 to input, revise and remove data and information used by the various systems and methods described herein, such as, for example, payment card holder information, reward program information, conversion rate information, or any other data or information that can be used to identify and recommend reward programs to payment card holders as described herein.

In some embodiments, administration module 540 enables an administrator of central rewards station 402 to establish parameters or rules associated with the various features and functionality described herein. For example, an administrator can establish limits, caps, delays, or fees associated with a payment card holder's use of the features and functionality described herein. Thus, a payment card holder can be limited to a predetermined number of transactions (e.g., reward program switches) over a predetermined period of time, such as annually or monthly, for example. Other predetermined periods of time are, of course, possible. A payment card holder can also be required to pay a fee to be able to switch between reward programs. Such a fee can be, for example, annually or monthly imposed or can be charged on a one-time or per-transaction basis. In some embodiments, the fee can comprise a monetary amount or any other form of measurable value. In some embodiments, delays can be imposed to verify that a particular exchange or movement of points was done properly and in good-faith (e.g., accrue points before they are actually available for redemption).

Recommendations module 545, in some embodiments, presents the payment card holder with recommended or suggested reward program(s) that can be of relevance based on the payment card holder's transaction or reward program history, for example. In some embodiments, the recommendations can also be made based on the payment card holder's future activity, behavior or transactions. For example, the payment card holder can specify that he intends to go to Orlando, Fla. for a week-long vacation in a month's time. The various systems and methods described herein can then recommend or suggest particular reward programs that can be relevant to the payment card holder's trip. In some embodiments, the payment card holder can be automatically enrolled in the recommended or suggested programs, while in some embodiments the payment card holder can be asked if he wants to enroll.

Payment card holder input module 550, in some embodiments, permits a payment card holder to interact with the various systems and methods described herein to provide necessary data and information. For example, payment card holder input module 550 can process payment card holder input relating to recommended or suggested reward programs. Payment card holder input module 550 can also process payment card holder input relating to future activity, behavior or transactions.

Figure 6:
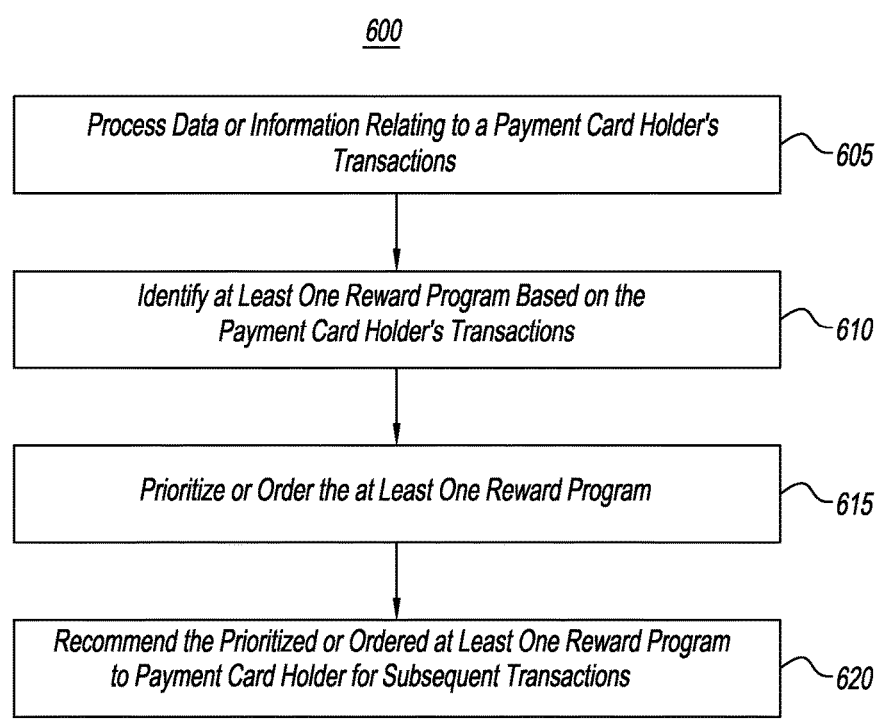
FIG. 6 is a flow chart for recommending rewards programs in accordance with exemplary embodiments of this disclosure.

FIG. 6 illustrates a process flow 600 for identifying, prioritizing and recommending at least one reward program, according to an embodiment of the present disclosure. At step 605, data or information relating to a payment card holder's transactions are processed. At step 610, at least one reward program based on the payment card holder's transactions is identified. At step 615, the at least one reward program is prioritized or ordered. At step 620, the prioritized or ordered at least one reward program is recommended to the payment card holder for subsequent transactions.

In particular, a first set of information comprising payment card holder transaction information including at least purchasing activities and optionally payment activities attributable to the payment card holder is identified at 605, and a second set of information comprising a plurality of rewards programs is identified at 610. One or more predictive behavioral spend profiles are generated based on the first set of information, and one or more correlations between the one or more predictive behavioral spend profiles and the plurality of rewards programs are identified. The rewards programs are prioritized at 615. The targeted information, based on the one or more correlations, is recommended to the one or more entities (e.g., a payment card holder or merchant) at 620. The targeted information includes at least one or more suggestions or proposals for payment card holder affiliation with one or more rewards programs.

Figure 7:
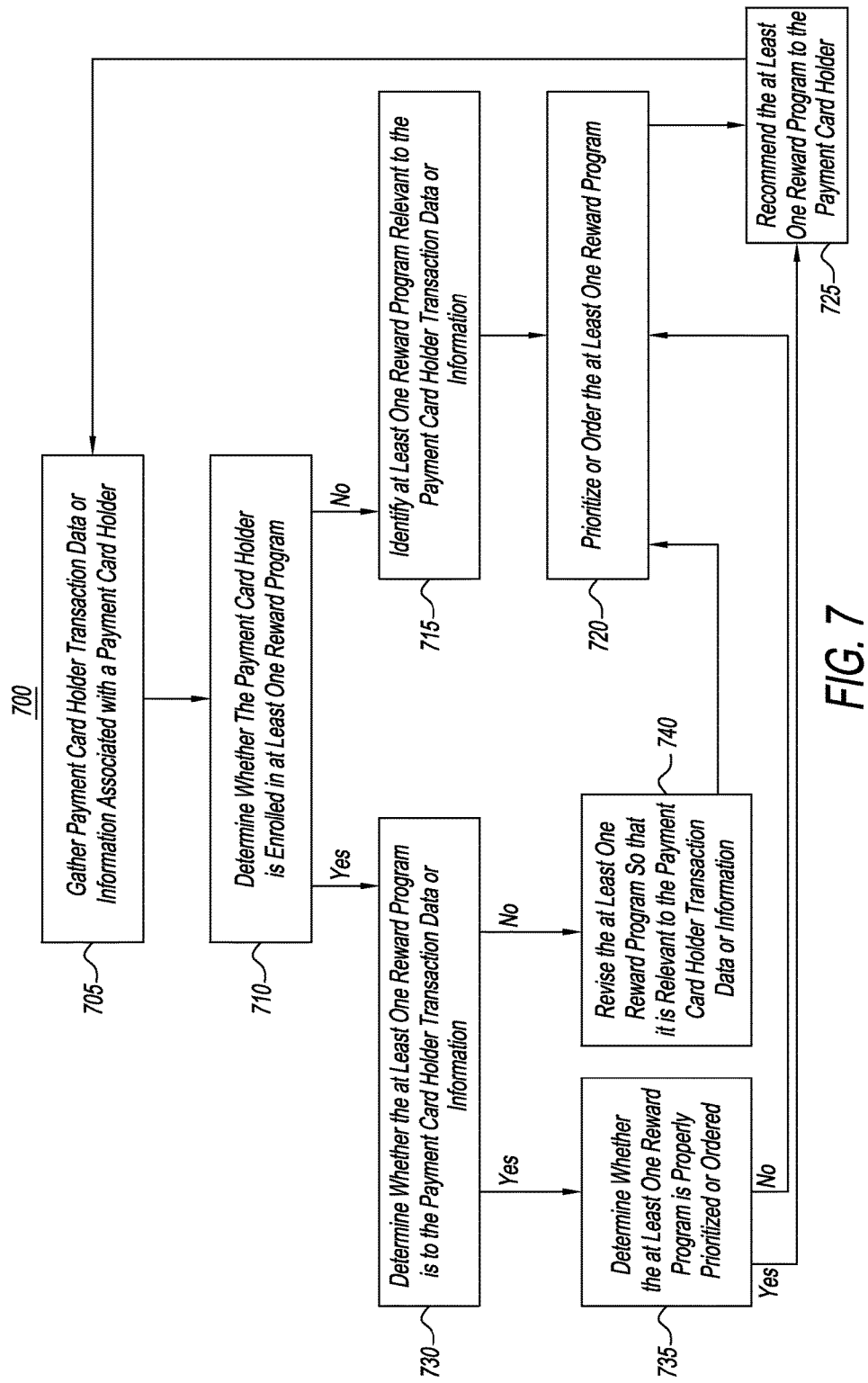
FIG. 7 is a flow chart for recommending rewards programs in accordance with exemplary embodiments of this disclosure.

FIG. 7 illustrates a process flow 700 for identifying, prioritizing and recommending reward programs, according to various embodiments of this disclosure. At step 705, payment card holder transaction data or information associated with a payment card holder is gathered. At step 710, a determination is made whether the payment card holder is enrolled in at least one reward program. If yes, at step 730, a determination is made whether the at least one reward program is related to the payment card holder transaction data or information. If yes, then at step 735, a determination is made whether the at least one reward program is properly prioritized or ordered. If yes, then at step 725, the at least one reward program is recommended to the payment card holder. After a predetermined period of time (e.g., monthly), the process begins anew at step 705.

Referring back to step 730, if, however, the at least one reward program is not relevant to the payment card holder's transaction data or information, then at step 740 the at least one reward program is revised so that it is relevant to the payment card holder's transaction data or information. In some embodiments, such revision can comprise identifying at least one reward program that is relevant to the payment card holder's transaction data or information. At step 720, the at least one reward program that is relevant to the payment card holder's transaction data or information is prioritized or ordered. Next, at step 725, the at least one reward program is recommended to the payment card holder. After a predetermined period of time (e.g., monthly), the process begins anew at step 705.

Referring back to step 710, if, however, the payment card holder is not enrolled in at least one reward program, then at step 715, at least one reward program relevant to the payment card holder transaction data or information is identified. Next, at step 720, the at least one reward program that is relevant to the payment card holder's transaction data or information is prioritized or ordered. Next, at step 725, the at least one reward program is recommended to the payment card holder. After a predetermined period of time (e.g., monthly), the process begins anew at step 705.

In particular, referring to certain embodiments of FIG. 7, a first set of information comprising payment card holder transaction information including at least purchasing activities and optionally payment activities attributable to the payment card holder is gathered at 705, and a second set of information comprising a plurality of rewards programs is identified at 715. One or more predictive behavioral spend profiles are generated based on the first set of information, and one or more correlations between the one or more predictive behavioral spend profiles and the plurality of rewards programs are identified. The rewards programs are prioritized at 720. Targeted information (i.e., at least one reward program), based on the one or more correlations, is recommended to one or more entities (i.e., a payment card holder) at 725. The targeted information, based on the one or more correlations, can optionally be recommended to a merchant or other entity. The targeted information includes at least one or more suggestions or proposals for payment card holder affiliation with one or more rewards programs.

Figure 8:
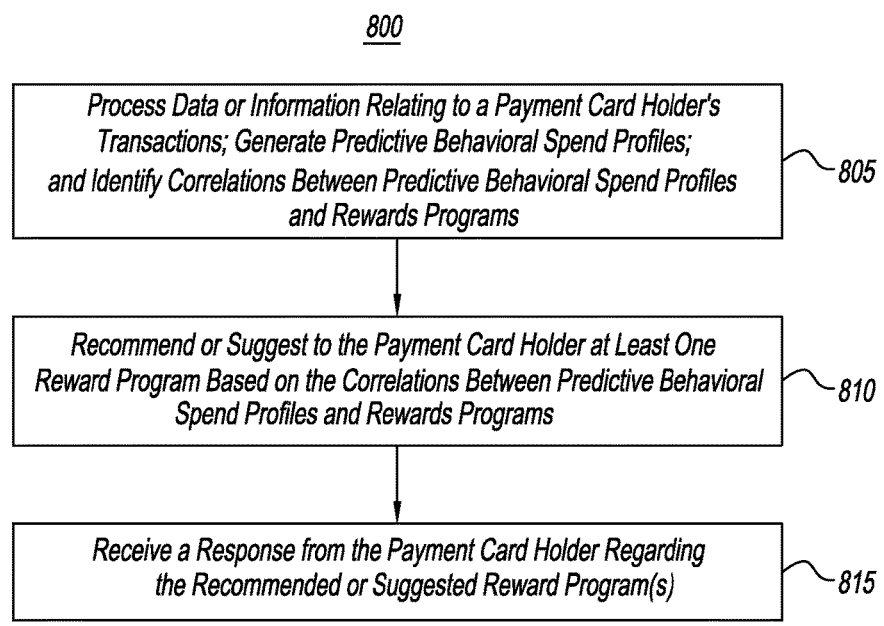
FIG. 8 is a flow chart for recommending rewards programs in accordance with exemplary embodiments of this disclosure.

FIG. 8 illustrates a process flow 800 for recommending rewards programs, according to various embodiments of the disclosure. At step 805, data or information relating to a payment card holder's transactions are processed as described herein. At step 810, at least one reward program is recommended or suggested to the payment card holder based on the payment card holder's transactions. At step 815, a response from the payment card holder is received relating to the recommended or suggested reward program. In some embodiments, the response can be a request to enroll the payment card holder in the recommended or suggested reward program.

In particular, a first set of information comprising payment card holder transaction information including at least purchasing activities and optionally payment activities attributable to the payment card holder is identified at 805, and a second set of information comprising a plurality of rewards programs is identified at 805. One or more predictive behavioral spend profiles are generated based on the first set of information, and one or more correlations between the one or more predictive behavioral spend profiles and the plurality of rewards programs are identified at 805. The targeted information, based on the one or more correlations, is recommended to the one or more entities (e.g., a payment card holder or merchant) at 810. A response from the payment card holder is received relating to the recommended or suggested reward program at 815. The targeted information includes at least one or more suggestions or proposals for payment card holder affiliation with one or more rewards programs.

Figure 9:
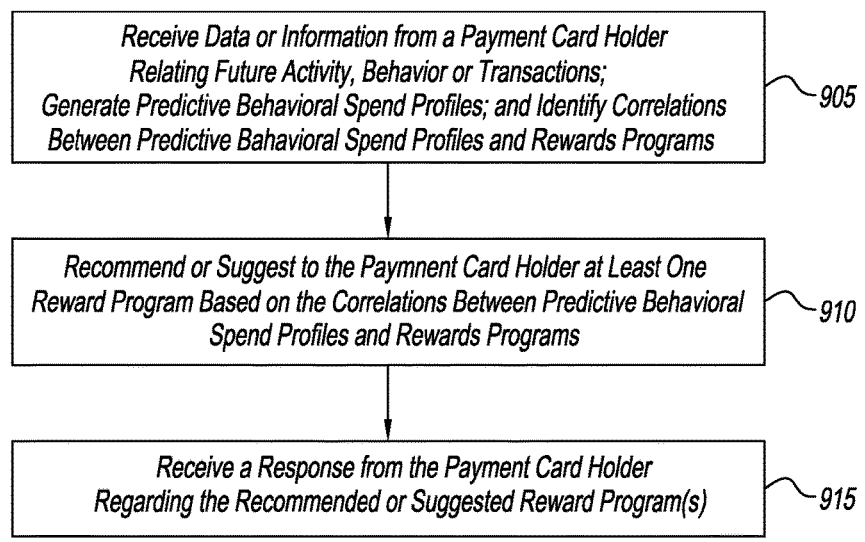
FIG. 9 is a flow chart for recommending rewards programs in accordance with exemplary embodiments of this disclosure.

FIG. 9 illustrates a process flow 900 for recommending rewards programs according to various embodiments of this disclosure. At step 905, data or information relating to a payment card holder's future activities, behavior or transactions is received. At step 910, at least one reward program is recommended or suggested to the payment card holder based on the payment card holder's future activities, behavior or transactions. At step 915, a response from the payment card holder is received relating to the recommended or suggested reward program. In some embodiments, the response can be a request to enroll the payment card holder in the recommended or suggested reward program.

In particular, a first set of information comprising future payment card holder transaction information including at least future purchasing activities and optionally payment activities attributable to the payment card holder is identified and received at 905, and a second set of information comprising a plurality of rewards programs is identified at 905. One or more predictive behavioral spend profiles are generated based on the first set of information, and one or more correlations between the one or more predictive behavioral spend profiles and the plurality of rewards programs are identified at 905. The targeted information, based on the one or more correlations, is recommended to the one or more entities (e.g., a payment card holder or merchant) at 910. A response from the payment card holder is received relating to the recommended or suggested reward program at 915. The targeted information includes at least one or more suggestions or proposals for payment card holder affiliation with one or more rewards programs.

The embodiments of the present disclosures are not to be limited in scope by the specific embodiments described herein. For example, although many of the embodiments disclosed herein have been described with reference to rewards programs, the principles herein are equally applicable to the any type of program, rewards or otherwise, that may enroll customer or users. In addition, although many of the embodiments disclosed herein have been described with reference to a central rewards program station that is associated with a card issuer, such as a bank, for example, it should be appreciated that various aspects of the disclosure can be accomplished when various system components are located elsewhere. For instance, the central rewards program station described herein can be maintained and administered by a third party service provider. Indeed, various modifications of the embodiments of the present disclosures, in addition to those described herein, will be apparent to those of ordinary skill in the art from the foregoing description and accompanying drawings. Thus, such modifications are intended to fall within the scope of the following appended claims.

It will be understood that the present disclosure can be embodied in a computer readable non-transitory storage medium storing instructions of a computer program which when executed by a computer system results in performance of steps of the method described herein. Such storage media can include any of those mentioned in the description above.

Where methods described above indicate certain events occurring in certain orders, the ordering of certain events can be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

The techniques described herein are exemplary, and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method performed by a data processing apparatus, the method comprising:

retrieving from one or more searchable databases a first set of information comprising payment card holder transaction information including transaction history for a payment card attributable to a payment card holder, wherein the transaction history has been obtained from a plurality of point of sale (POS) devices of a plurality of merchants;

retrieving from the one or more searchable databases a second set of information comprising a plurality of rewards programs;

analyzing the first set of information to determine behavioral information of the payment card holder;
extracting information related to an intent of the payment card holder from the behavioral information as a basis to predict desirable spend behaviors, as well as a specific future spend behavior of the payment card holder;
generating one or more predictive behavioral spend profiles based on both the behavioral information and the predicted desirable spend behavior of the payment card holder;
analyzing the one or more predictive behavioral spend profiles with respect to the second set of information;
identifying one or more correlations between the one or more predictive behavioral spend profiles and the plurality of rewards programs;
determining whether the payment card holder is enrolled in at least one of the plurality of rewards programs;
determining a plurality of payment card holder affiliation rewards programs in which the payment card holder is not enrolled for the payment card holder based on the one or more correlations;
prioritizing the plurality of payment card holder affiliation rewards programs and the enrolled rewards program in an order in which the payment card holder realizes greater savings with one or more of the plurality payment card holder affiliation rewards programs in which the payment card holder is not enrolled than with the enrolled rewards program;
providing a proposal for a specific one of the plurality of payment card holder affiliation rewards programs to one or more entities based on the prioritizing; and
receiving a response to enroll in the specific one of the plurality of payment card holder affiliation rewards programs from the payment card holder via a payment card holder station of the payment card holder.

2. The method of claim 1, wherein the one or more entities comprise the payment card holder or a merchant.

3. The method of claim 1,
receiving a response to the proposal; and
enrolling the payment card holder in the specific one of the plurality of payment card holder affiliation rewards programs based on the response.

4. The method of claim 1, further comprising algorithmically analyzing the first set of information to generate the one or more predictive behavioral spend profiles.

5. The method of claim 1, further comprising algorithmically analyzing the one or more predictive behavioral spend profiles and the second set of information to identify one or more correlations between the one or more predictive behavioral spend profiles and the plurality of rewards programs.

6. The method of claim 1, wherein the first set of information comprises payment card billing, purchasing and/or payment transactions, and optionally demographic and/or geographic information attributable to the payment card holder.

7. The method of claim 1, wherein the second set of information comprises rewards programs that are structured marketing efforts that reward loyal buying behavior or behavior that is beneficial to a merchant.

8. The method of claim 1, wherein the rewards programs are offered by major retailers, pharmacies, supermarkets, hardware stores, hotel chains, airlines, car rentals, and banks.

9. The method of claim 1, further comprising:
tracking and measuring impact of the proposal based on the one or more correlations after the targeted information has been provided to the one or more entities.

10. The method of claim 1, wherein the one or more predictive behavioral spend profiles provides a behavioral propensity score that is analyzed with the second set of information to identify one or more correlations between the one or more predictive behavioral spend profiles and the plurality of rewards programs, and wherein the behavioral propensity score is indicative of a propensity to exhibit a certain behavior.

11. A system comprising:
one or more databases configured to store a first set of information comprising payment card holder transaction information including at least purchasing activities attributable to a payment card holder;
one or more databases configured to store a second set of information comprising a plurality of rewards programs;
a memory comprising program instructions; and
a processor configured to execute the program instructions in the memory to:
analyze the first set of information to determine behavioral information of the payment card holder;
extracting information related to an intent of the payment card holder from the behavioral information as a basis to predict specific future spend behavior and future desirable spend behaviors;
generate one or more predictive behavioral spend profiles based on the behavioral information and the predicted future desirable spend behaviors of the payment card holder;
analyze the one or more predictive behavioral spend profiles and the second set of information;
identify one or more correlations between the one or more predictive behavioral spend profiles and the plurality of rewards programs;
determine whether the payment card holder is enrolled in at least one of the plurality of rewards programs;
determine a plurality of payment card holder affiliation rewards programs in which the payment card holder is not enrolled for the payment card holder based on the one or more correlations;
prioritize the determined card holder affiliation rewards programs in an order in which the payment card holder realizes the greatest savings out of the determined payment card holder affiliation rewards programs in which the payment card holder is not enrolled; and
provide targeted information, based on the one or more correlations and prioritized card holder affiliation rewards programs, to a merchant station, a payment card holder statement, or both.

12. The system of claim 11, wherein the targeted information includes at least one or more suggestions or proposals for payment card holder affiliation with one or more rewards programs.

13. The system of claim 11, wherein the processor is further configured to perform one of the following functions selected from the group consisting of (a) algorithmically analyze the first set of information to generate the one or more predictive behavioral spend profiles, and (b) algorithmically analyze the one or more predictive behavioral spend profiles and the second set of information to identify one or more correlations between the one or more predictive behavioral spend profiles and the plurality of rewards programs.

14. The system of claim 11, wherein the first set of information comprises payment card billing, purchasing and/or payment transactions, and optionally demographic and/or geographic information attributable to the payment card holder.

15. The system of claim 11, wherein the second set of information comprises rewards programs that are structured marketing efforts that reward loyal buying behavior or behavior that is beneficial to a merchant.

16. The system of claim 11, wherein the processor is further configured to:
 track and measure impact of the targeted information, based on the one or more correlations, provided to the one or more entities, after the targeted information has been provided to the one or more entities.

17. The system of claim 11, wherein the one or more predictive behavioral spend profiles provides a behavioral propensity score that is analyzed with the second set of information to identify one or more correlations between the one or more predictive behavioral spend profiles and the plurality of rewards programs, and wherein the behavioral propensity score is indicative of a propensity to exhibit a certain behavior.

\* \* \* \* \*